Feb. 3, 1942.  R. P. GARRISON ET AL  2,271,637
THERMALLY CONTROLLED GRINDER HEAD
Filed Feb. 2, 1938  7 Sheets-Sheet 4

Feb. 3, 1942.   R. P. GARRISON ET AL   2,271,637
THERMALLY CONTROLLED GRINDER HEAD
Filed Feb. 2, 1938   7 Sheets-Sheet 6

Fig.-7

Patented Feb. 3, 1942

2,271,637

UNITED STATES PATENT OFFICE 2,271,637

THERMALLY CONTROLLED GRINDER HEAD

Ralph P. Garrison and John R. Garrison, Dayton, Ohio

Application February 2, 1938, Serial No. 188,358

16 Claims. (Cl. 51—281)

REISSUED
MAY 22 1951
RE 23367

This invention comprises a method and apparatus for controlling stresses, strains and variations of position in machine tools and machine tool parts developed incident to temperature fluctuations and resultant contraction and expansion as produced by operation of the machine tool and changes in atmospheric temperatures. The invention is particularly applicable to any machine tool wherein work pieces and tools are relatively positioned and the work piece and tool relatively moved for affecting a desired result in the work piece, although it is equally applicable to machines and apparatus of all kinds.

It might seem that the natural and logical manner of counteracting the effect of heat generated during operation of the machine would be by air cooling the part, or by circulating other cooling medium by which the generated heat would be dissipated. However, cooling of the bearing and frame merely causes contraction and tightness of the bearing with a consequent development of more heat, necessitating an increased amount of cooling. Use of the cooling principle is likewise conducive to undesirable "sweating." The present system overcomes these difficulties and provides for uniform operating conditions by heating the bearing, frame, and the spindle, and other parts in contact directly or indirectly with the bearing and frame, to a degree at least equal to the highest temperature likely to be developed during operation, and providing automatic control means for maintaining this as a uniform working temperature by circulation of heating medium and the employment of suitable heaters therefor under thermostatic control.

In machines as ordinarily constructed, bearings are fitted at a temperature far below that which is attained during the operation of the machine, and are likewise set up in their supports at the same low temperature with the result that the supports and bearings both attain a considerably higher temperature during operation of the machine over a period of time than when the bearings were fitted. As a result of this assembly practice, when the machine is put into operation there is a definite change in position in the machine and parts due to expansion and contraction, which is directly proportional to change in temperature, and which directly affects machine alignment and the work result produced by the machine. In accordance with this invention, vital parts of a machine are manufactured and assembled and the bearings therefor fitted or "run in" while the various machine parts are at a temperature at least equal to the temperature attained by the machine parts as a result of operation of the machine. Thus, the machine and important parts are manufactured and assembled in a condition and in a position coincident with the particular "normal" running temperature of the machine, and are maintained in that position both during the operation of the machine and when the machine is idle whereby the machine parts will not be subjected to contraction and expansion resulting from temperature change, and their position affected thereby.

The construction herein illustrated is particularly adapted to centering and holding beveled gears for performing machining, refinishing, boring, or grinding operations thereon. It is understood, however, that the present device is adaptable for holding articles other than gears and for all manner of machining, grinding, boring and other operations. As well as embodying means for controlling the temperature of the machine, the machine is so constructed and arranged that work may be supported without overhang, and with the center of the work piece practically in line with the front work support end. Also, it is so constructed and arranged that the work may be loaded into the chuck from a lateral direction between the supporting bearings, and means are provided for protecting an operator from contact with moving parts.

One object of the invention is to simplify the construction as well as the means and mode of operation of a device as disclosed herein whereby such devices may not only be economically manufactured, but will be more efficient and accurate in use, adaptable to a wide variety of work pieces, of relatively few parts and unlikely to get out of repair.

Another object of the invention is to provide method and apparatus for temperature control in machines of the character disclosed which is simple yet highly efficient in operation, and wherein the apparatus embodies control means adaptable to maintain the apparatus at any preselected "normal" temperature.

Another object of the invention is to provide method and apparatus for temperature control whereby stresses and strains, and variations in position of machine parts developed incident to temperature change from any source and resultant contraction and expansion are eliminated.

A further object of the invention is to provide method and apparatus for temperature control which will eliminate any delay incident to a machine being successively in and out of a desired operating condition.

A further object of the invention is to increase the life of bearings and the journals operating therein by providing for a closer original fit between the bearings and journals, and maintaining such fit substantially constant so far as it may be affected by contraction and expansion.

A further object of the invention is to provide for maintenance of the same clearance between bearings and associated journals, except such variations as may be induced by wear, at all times and regardless of whether the machine tool is in or out of operation.

A further object of the invention is to provide for maintenance of the lubricant at a constant temperature and thus eliminate any rise in temperature on initial operation of the machine tool due to the lubricant being at a relatively high viscosity and rubbing over itself.

A further object of the invention is to provide for maintenance of a temperature in the machine which is higher than room temperature whereby temperature of the machine is not affected by fluctuations in room temperature.

A further object of the invention is to provide, by temperature control, for the elimination of endwise float of spindles due to expansion and contraction of the spindle, bearings, frame and other parts.

A further object of the invention is to insure uniformity of precision method production by maintaining the operating condition constant.

A further object of the invention is to provide a machine of the character hereinafter described wherein there is a minimum or no overhang of the work piece with respect to its support.

A further object of the invention is to provide for ease of loading a work piece in its support.

A further object of the invention is to provide safety features in the machine for the protection of the operator of the tool from moving parts.

A further object of the invention is to provide a machine possessing the meritorious characteristics above mentioned.

With the above primary and other incidental objects in view, as will more fully appear in the specification, the invention consists of the features and methods of construction, the parts and combinations thereof, and the mode of operation, or their equivalents, as hereinafter described and set forth in the claims.

Referring to the accompanying drawings wherein is found the preferred but obviously not necessarily the only form of embodiment of the invention.

Like parts are indicated by similar characters of reference throughout the several views.

For illustrative purposes, but with no intent to unduly limit the application or scope of the invention, the assembly herein shown and described is especially designed for grinding the rear, side and bore of a typical automotive driving gear of the spiral bevel type.

Figure 1:
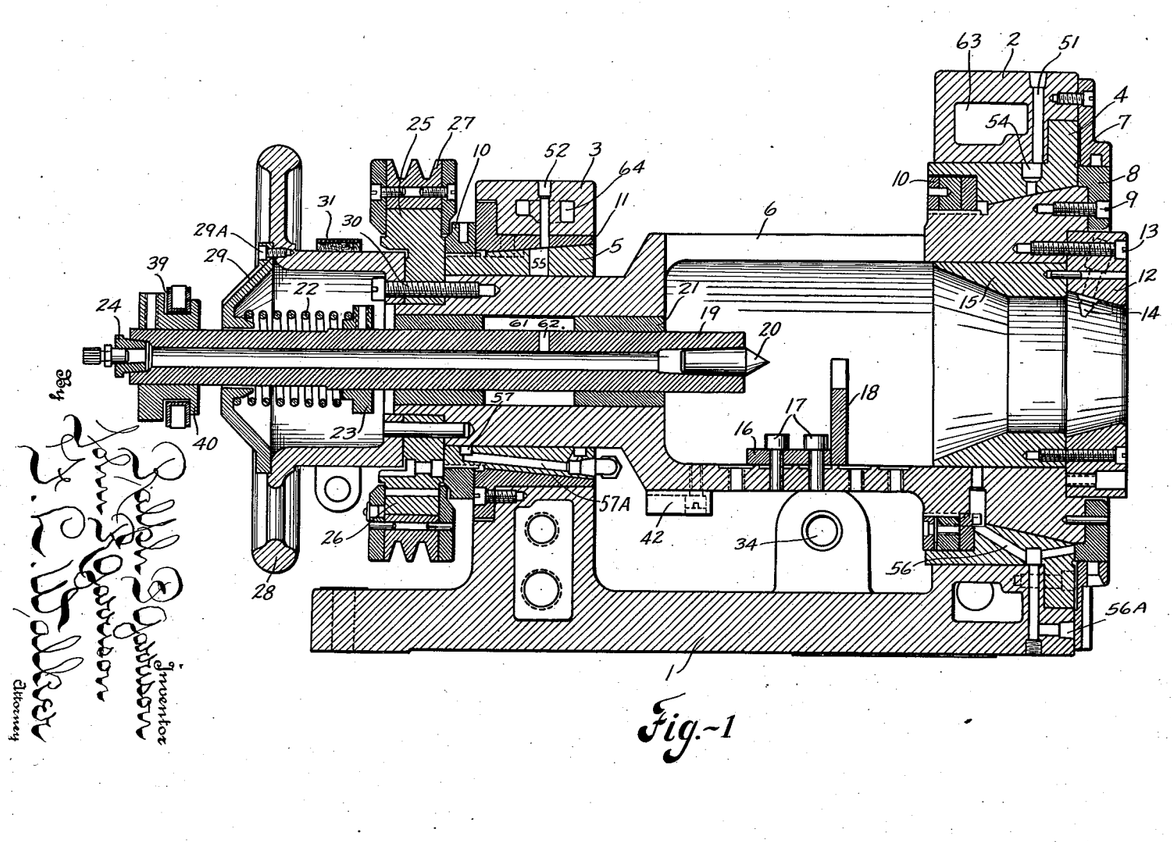
Fig. 1 is a view, partly in elevation and partly in section, showing a work holder or chuck having temperature control means applied thereto in accordance with the idea disclosed by this invention.

Referring to the drawings, and particularly Fig. 1 thereof, there is shown a work holder or chuck including a base portion 1 for upright supporting members 2 and 3 in which suitable bearings 4 and 5 are respectively mounted, and in which bearings a spindle 6 rotates. The upright 2 is provided with a bearing cover plate 7 and a thrust ring 8, the thrust ring being held in position by bolts 9. Both the front and rear bearings have adjusting nuts 10, and the upright 3 is shown as having a bearing liner 11, with the spindle 6 mounted to float in the bearing 5.

Figures 4, 5, 9:
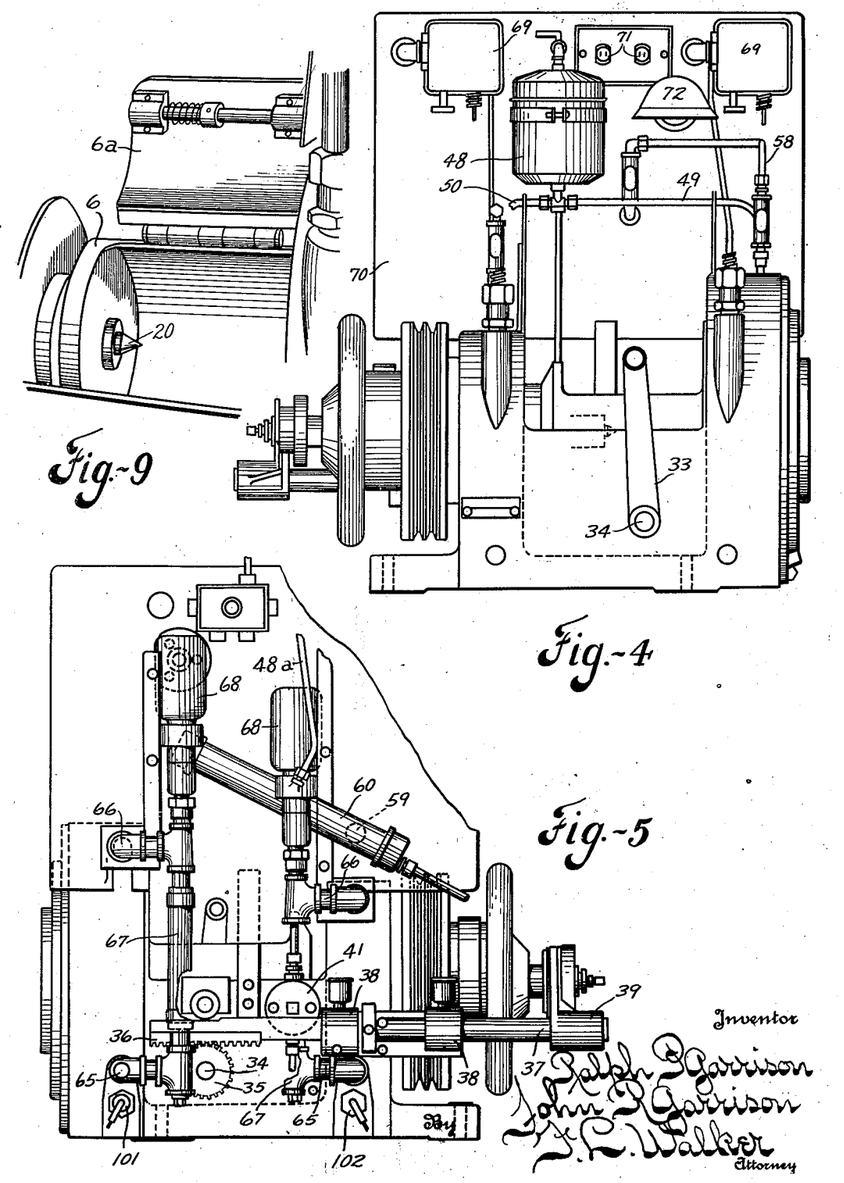
Fig. 4 is a front elevation showing the regulating and indicating mechanism for the temperature control means.
Fig. 5 is a rear elevation of the regulating and indicating mechanism shown in Fig. 4.
Fig. 9 is a perspective view showing the door which permits access to the hollow spindle, such door being in open position.

The portion of the spindle 6 extending forwardly of the upright 3 and bearing 5 is hollow to form a holder in which the gear or other work piece is mounted. The hollow portion of the spindle 6 has a lateral opening permitting access to the interior of the spindle, and a door 6a, Fig. 9, having a suitable latch is hinged to the spindle and rotates therewith covering the opening in the spindle side walls and barring access to the interior of the spindle when closed. Such door also serves to properly balance the spindle. An interchangeable chuck 12 in the forward end of the interior of the hollow spindle 6 is secured to the spindle by bolts 13 and includes locating studs 14, the interchangeable chuck being fully disclosed in the copending application of John Russell Garrison, Serial No. 302,385, filed November 1, 1939. In order that a work piece inserted into the hollow spindle 6 may be guided into proper position relatively to the chuck 12, a loading tube 15 is disposed within the hollow spindle and in advance of the chuck 12, the loading tube being inclined in a direction toward the chuck so as to guide the work piece into proper engagement therewith.

Within the hollow spindle 6, and to the rear of the chuck 12 and loading tube 15, is a support for a pinion gear shaft which takes the form of an L-shaped member 16 having one leg secured to the inner surface of the hollow spindle 6 as by bolts 17 and having the shaft supporting leg 18 extending toward the center of the hollow spindle 6. The leg 18 terminates in such position that the free end of the gear shaft may be readily engaged by a center bar 19 having a replaceable center 20 in its forward end and movable longitudinally or endwise in bushings 21 within the small end of the spindle 6 under the action of a compression spring 22 bearing against a collar 23 rigidly secured to the center bar for yieldingly engaging the free end of a gear shaft and yieldingly forcing the gear into engagement with the interchangeable chuck 12. The leg 18 may be made adjustable as to height if desired.

The spindle 6 is rotated in its bearings 4 and 5 to rotate the gear relative to a tool supported at the end of the spindle by an overrunning clutch 25 including driving rollers 26 and a pulley 27 over which a belt from a motor or the like passes, or by means of a hand wheel 28 rigidly mounted on the spindle 6 by bolts 30. The spring 22 is held in place by a cover casting 29 and screws 29a. To stop rotation of the spindle 6, a brake band 31 surrounds the drum of hand wheel 28 and is operable by a hand lever 32, Fig. 2, pivotally mounted on the frame 1 and interconnected with one end of the brake band 31.

Figure 2:
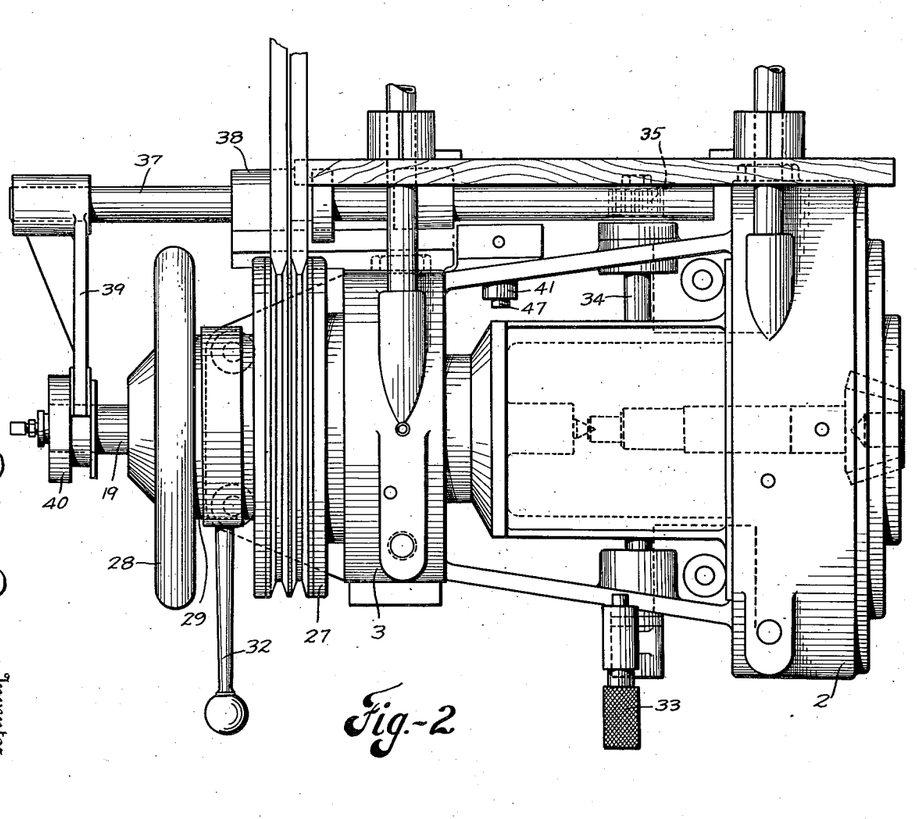
Fig. 2 is a top plan view of the work holder or chuck shown in Fig. 1.

A hand lever 33, Fig. 2, moves the center bar 19, Fig. 1, longitudinally or endwise in its bushings 21 against the resistance of the compression spring 22. The hand lever 33 is rigidly secured to one end of a shaft 34 extending transversely of the base 1 beneath the spindle 6, and the shaft 34 has rigidly secured to its opposite end a pinion 35 which coacts with a rack 36, Fig. 5, forming a part of a rack bar 37 on the rearward side of the base 1 and mounted in suitable supports 38 for endwise or longitudinal movement. Rigidly secured to one free end of the rack bar 37 is a forked arm 39, the forked end of which loosely engages a collar 40 secured to the center bar 19. Thus, when the hand lever 33 is moved to the left, Figs. 4 and 5, to rotate the shaft 34, the rack bar 37 is moved longitudinally or endwise by the pinion 35 and rack 36 and moves the center bar 19 longitudinally or endwise against the resistance of the compression spring 22 through the connection between the rack bar and the center bar 19 by means of the forked arm 39 and collar 40. To vary the extent of movement of the center bar 19 so as to accommodate gear shafts of different lengths, the collar 40 may be adjusted along the length of the bar.

Referring to Figs. 1 and 2, the chuck 12 is within the vertical plane of the front spindle bearing 4. Thus, there is no overhanging of the gear with respect to the bearing support for the chuck which lends to freedom from chatter and insures a minimum of run-out error as compared to chucks where there is a substantial overhang of the chucked gear. Where overhang is present, any error in the work head bearings or in mounting the interchangeable chuck is multiplied, and this error might very well be so great as to make it impossible to achieve the extreme accuracy and fine finish required.

Lubrication is provided for the bearings 4 and 5 by an oil pump 41 operated by a projection 42 on the spindle 6, which on each rotation strikes the pump piston rod 47 and actuates the pump piston. Lubricant is forced from the pump 41 into an oil filter 48, Fig. 4, from which it flows without pressure other than the few inches the head of oil in the filter is above the bearings through inlet conduits 49 and 50 to the front and rear bearings 4 and 5 respectively. Pump 41 delivers more lubricant than is needed to the filter 48, and the overflow returns to the supply tank by way of a pipe 48a and an overflow header. Thus a constant head of lubricant is maintained in the filter 48.

Figure 3:
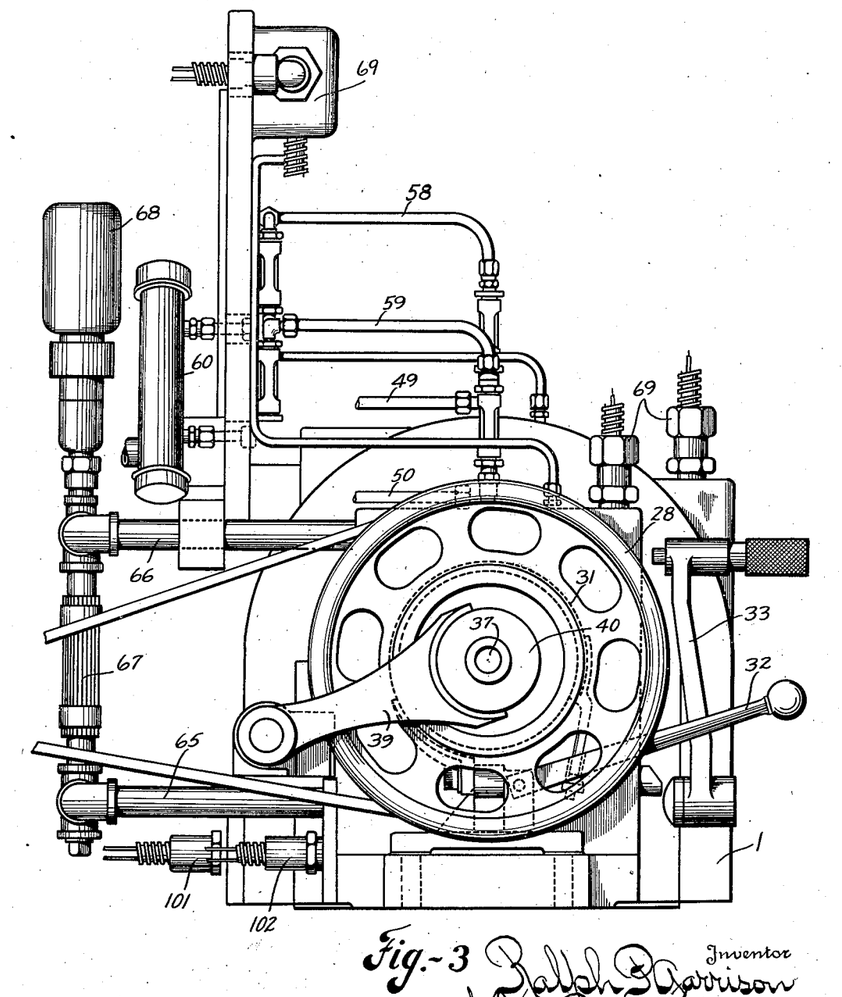
Fig. 3 is an end elevation of the work holder or chuck shown in Figs. 1 and 2, and showing more fully the temperature control means.

The inlet conduits 49 and 50 lead to passages 51 and 52 in the bearing supports 2 and 3 and communicate with passages 54 and 55 in the bearings 4 and 5 which convey the lubricant to eccentrically formed oil grooves in the bearings 4 and 5. Such bearings 4 and 5 utilize all the lubricant they require, and excess lubricant not used by the bearings 4 and 5 leaves the sight glasses through conduits 58 and 59 (Fig. 3) to bearing overflow header 60. Used and surplus oil passing through the bearings 4 and 5 (Fig. 1) leave the bearings through channels 57, 57a and 56, 56a, which are connected to a suitable reserve oil tank. The header 60 is considerably larger than the combined capacity of the overflow conduits leading into it. Consequently, there is never any back pressure in the header to restrict the flow of lubricant. Sight glasses are disposed in the lubricant conveying lines, and means are provided for venting the lines. A hand or automatic valve may be provided in the overflow line 48a from the filter 48 to the header 60 to break the syphonic action when the device is not in use so as to prevent the lubricant in the filter from siphoning out into the header.

The center bar 19 is hollow to receive a supply of lubricant introduced under pressure through fitting 24 at the end of the bar, the lubricant entering a chamber 61 between the bushings 21 by way of a port 62. The chamber 61 holds a supply of lubricant which is conveyed to the bearing surfaces of the center bar 19 and bushings 21 by the longitudinal or endwise movement of the center bar.

The uprights 2 and 3 include jackets 63 and 64 which surround the bearings 4 and 5 and the spindle 6 at its points of rest in the bearings for the circulation of a liquid, for example, water. Heaters 101 and 102, one for each bearing, preferably electric, are disposed in the bottom of each jacket, and a flow circuit is provided through each jacket 63 and 64 by means of pipes 65, 66 and 67 having liquid supply reservoirs 68 interconnected therewith. Thus, a thermo-syphonic circulating system is established, with the cooled or cold liquid entering at the bottom of the jackets where it is subjected to the heating means, and upon being heated rises in the jackets to thus establish a flow. The liquid reservoirs 68 maintain the flow circuit including the jackets and the pipes 65, 66 and 67 constantly filled, and likewise serve as a deterrent on rapid or violent temperature fluctuation of the liquid in the circulating system. As the liquid becomes heated it rises into the reservoirs 68 and displaces a corresponding volume which is at atmospheric temperature, the displaced liquid flowing into the line, and by reason of this constant interchange of liquid any rapid change in temperature of the liquid in the line is obviated. It will be noted that the top positions of the jackets 63 and 64 have greater exposed areas than the bottoms of the jackets. Consequently, heat will be dissipated faster at the tops of the jackets, whereby the temperature of the liquid will be approximately equal throughout the entire jackets. Thermostatic control means 69, one for each of the front and rear bearings, are provided for controlling operation of the heating units and thus the temperature of the liquid in the jackets. Suitable air vents prevent air pockets forming in the jackets.

Heat from the liquid in the jackets 63 and 64 is dissipated to the bearings 4 and 5 and associated parts of the machine and by controlling the temperature of the liquid, the temperature of the machine parts may be regulated. That is, the highest temperature attained by the machine parts as a result of machine operation may be adopted as "normal" for the temperature of the liquid in the jackets, and that temperature in the machine maintained constant both during machine operation and when the machine is idle. Such "normal" temperature, while higher than room temperatures, is always less than the temperature at which the oil film in the bearings 4 and 5 will break down.

The provision of heating means as just described makes it possible to make and set the bearings and bearing fits with the machine parts at running temperature, or whatever temperature has been adopted as "normal." That is, in effect the machine as concerns the frame, the bearings and spindle assembly may be assembled at a temperature which does not change thereafter whereby the fit between the bearings and spindle and the bearings and their supports will remain the same without any change due to expansion or contraction resulting from temperature change. Thus, there may be a very minimum of clearance between the spindle and bearings, with that clearance remaining uniform through control of the temperature of the parts, which makes possible the use of a very thin oil, it being known that thin oil has less tendency to rub over itself and produce friction and heat.

It will be noted that the oil passages 51, 52, 54 and 55 through which oil is introduced to the front and rear bearings 4 and 5 are entirely surrounded by metal in intimate contact with the heated liquid in the jackets 63 and 64. The oil flow to the bearings is sufficiently slow that the oil is heated while flowing through the passages to the bearings and reaches the bearings at the same temperature as the heating liquid or the machine at that point. It is possible that the front and rear bearings may be intentionally maintained at different temperatures, but the oil temperature at each bearing is automatically controlled, and the heating of the oil is more positive since it is done substantially at the point of use and is not affected by outside conditions during transit to the bearings. This method of heating the oil is less expensive than external heaters which would also be less positive.

For convenience, an instrument panel 70 may be mounted in conjunction with the machine to support the oil filter 48, the thermostats 69, and the sight glasses in the oil lines. The heaters 101 and 102 are preferably connected with small pilot lights 71 which serve to indicate that the heaters are or are not operating, and which may also be mounted upon the instrument panel 70. There is a pilot light for each heater. An operator's light 72 may be provided on the instrument panel for the operator's convenience.

Figure 7:
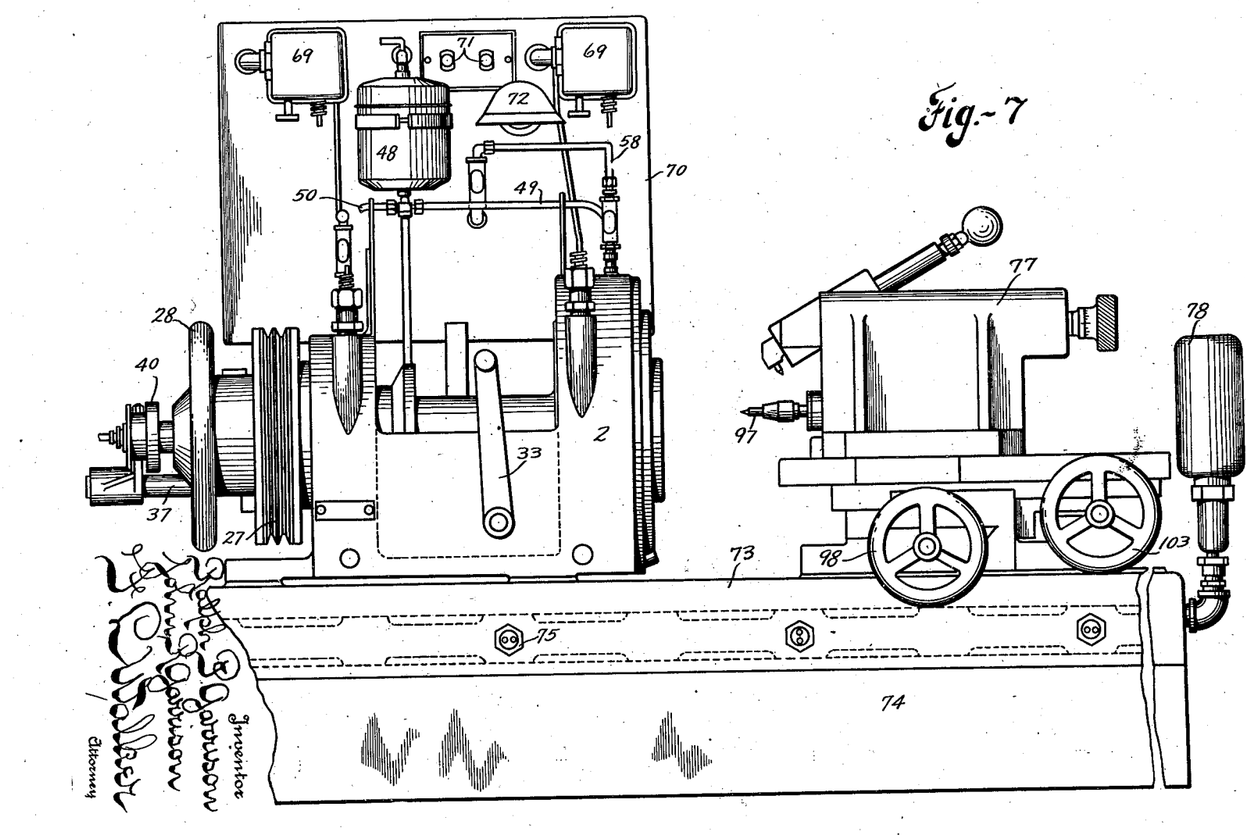
Fig. 7 is an elevation of a modified form of the invention showing the heating principle and the apparatus therefor as applied to the base of the machine.
Figure 8:
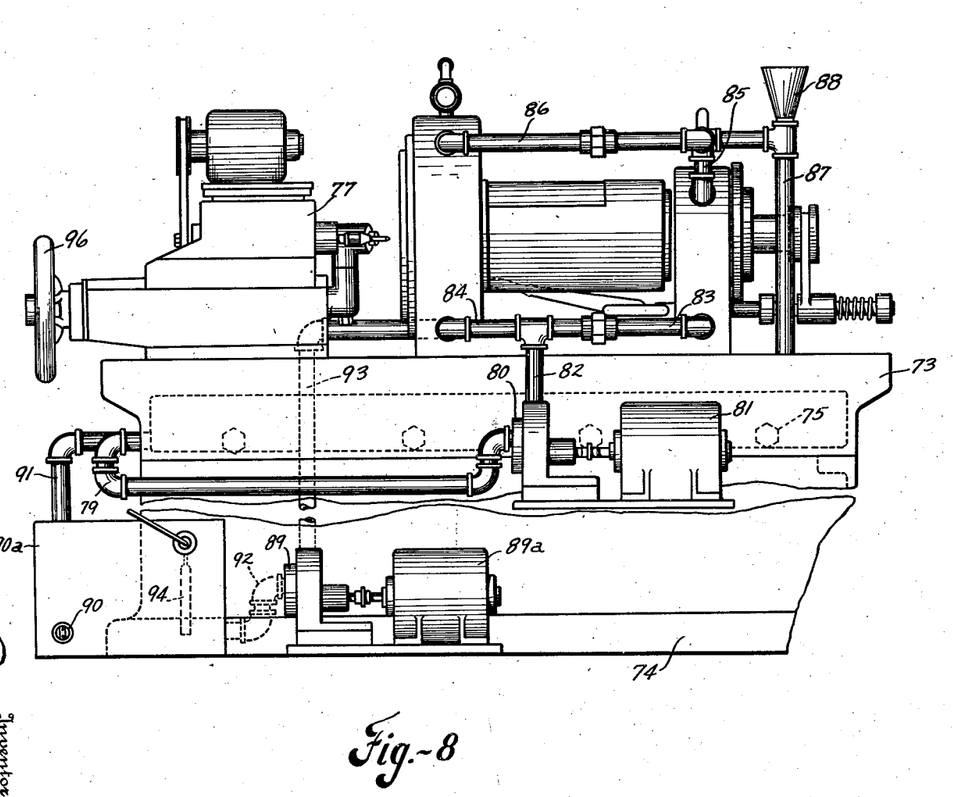
Fig. 8 is an elevation showing another modified form of the invention with the heating principle and apparatus therefor applied to the base of the machine.

In Figs. 7 and 8 the heating principle is applied to the base of the machine which supports both the work holder and the tool holding carriage, to thereby provide a machine base which will be stable and will not change position by contraction and expansion due to variations in temperature caused by any means and thus affect the relative positions of the work piece and tool. As shown in Fig. 7, a work holder as hereinbefore described is mounted on a sub-base or table 73 which is, in turn, mounted on a floor base 74. The sub-base or table 73 is shown as being a cored, ribbed, box-like member forming a tank for containing liquid, and having therein immersion heaters 75, preferably electric, but which may be of any well-known type. One or a plurality of thermostat bulbs, disposed in either the liquid in the tank formed by the table or sub-base 73 or in the metal going to make up the table or sub-base as the installation may require, may be provided to cooperate with suitable thermostatic control means for regulating operation of the immersion heaters 75. Thus, the sub-base or table may be maintained at a constant temperature and thereby unaffected as to position by temperature change and resultant contraction and expansion. Heat dissipated to the base 74, to the work holder hereinbefore described which is mounted on the table or sub-base 73, and to the tool holder 77, will serve likewise to maintain these parts at a constant temperature and eliminate changes in position due to expansion or contraction. A liquid supply reservoir 78 is provided to supply liquid to the tank formed in the sub-base or table 73 as required to maintain a constant head of liquid in the tank. It will be understood that all parts may be fit together or assembled while at the temperature to be maintained constant after fitting or assembly thereby eliminating stresses and strains resulting from subsequent temperature changes.

In Fig. 8 is illustrated another application of the heating principle. Whereas in Fig. 7, the means for heating the table or sub-base 73 and the heating means for the work holder mounted thereon are separate, in the structure shown in Fig. 8 the heating means is common to both. The sub-base or table forms a tank for containing liquid and in which there are immersion heaters 75. A conduit 79 leads from the interior of the tank, preferably at one end, to a pump 80 operated by a motor 81 so that liquid heated in the tank may be drawn therefrom by the pump and forced through a conduit 82 to branch conduits 83 and 84 leading to the respective jackets 63 and 64 about the bearings 4 and 5. The liquid is drawn out of the jackets 63 and 64 by the pump through conduits 85 and 86 and through a common conduit 87 to and through the tank in the sub-base or table 73 and over the immersion heaters 75 for reheating and recirculation through the jackets 63 and 64. Suitable thermostatic control means are provided for regulating operation of the immersion heaters 75 and a water supply reservoir 88 maintains the flow circuit continually filled with liquid.

For alternative use when desired, a pump 89 operated by a motor 89a may be provided which draws liquid from the tank in the sub-base or table 73 past a single immersion heater 90 in a tank 90a through conduits 91 and 92 and forces it through conduits 93, 83 and 84, through the respective jackets 63 and 64, and through conduits 85, 86 and 87 back to the tank in the sub-base or table 73. The immersion heaters 75 may or may not be utilized as heating means, and a thermostatic control means including a bulb 94 is provided in conjunction with the immersion heater 90 for controlling operation thereof. Continuous pumping of a relatively large volume of liquid will result in the temperature of the liquid returning to the tank 73 being practically the same as the temperature of the liquid at the outlet of the tank or at the point of entry into the jackets 63 and 64.

Figure 6:
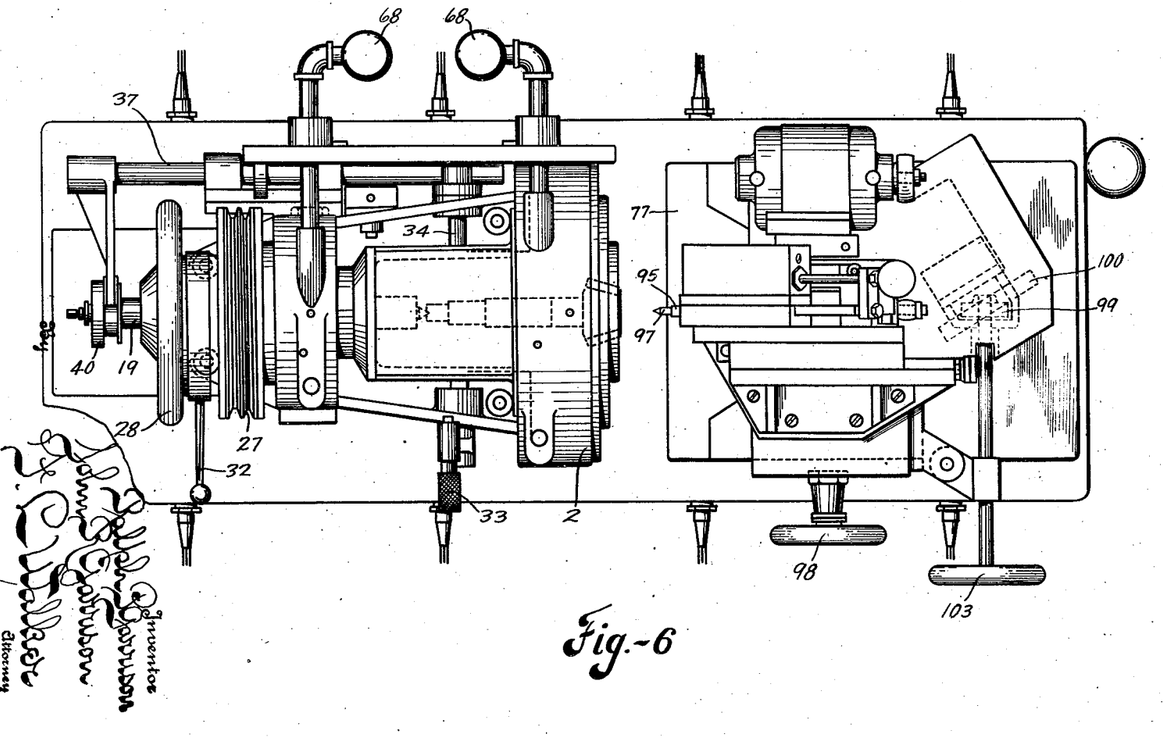
Fig. 6 is a top plan view of an entire machine tool, including the work holder or chuck, the tool for operating on the work, and the holding means therefor.

It is important that the centers in the part being finished have a smooth surface and be of the correct angle to insure the part rotating properly and being finished correctly when supported between male centers on the machine upon which the work is being done. One method of grinding centers has been to move the grinding element straight into the work and then feed the wheel laterally across the work until sparking indicated that the center had been ground concentric and round. On completing the grinding operation, some concentric lines or circles are visible on the ground surface, having been left there by the grinding wheel. For the purpose of eliminating such concentric lines or circles, the tool holder 77, Fig. 6, which is mounted for movement of the tool spindle 95 both parallel and perpendicularly to the center line of the work holder and work piece is also mounted for movement diagonally to the center line of the work holder and work piece. As shown in Fig. 8, the hand wheel 96 is provided for moving the tool holder 77 and tool 97 into the work piece along a line parallel to the longitudinal center line of the work piece. The hand wheel 98, Fig. 6, is provided for moving the tool holder 77 and tool 97 perpendicularly to the work piece center line, both movements of the tool holder 77 being along suitable ways as is well known in the art. To move the tool holder 77 and tool 97 diagonally of the longitudinal center line of the work piece, a hand wheel 103, Fig. 6, is provided for actuating a pinion gear 99 which meshes with a rack 100 disposed diagonally to the center line of the work holder and work piece, suitable ways being provided for movement of the tool holder and tool in such direction. The temperature control means hereinbefore described serves to eliminate any change in position of both the work piece and tool due to expansion and contraction of parts induced by temperature change.

Controlling the relationship of the various machine units or parts to each other, and maintaining a given setting or adjustment of the machine units or parts constant regardless of temperature changes exteriorly of the machine by controlling temperature change within the machine insures uniform accuracy of work produced in the machine and saves much machine operating time now lost in making part contraction and expansion compensating adjustments in machines not temperature controlled.

The principle herein disclosed is applicable to any and all machines where accuracy of work produced is dependent upon the relative position of a part of the machine or its fixtures to some other parts or fixtures, and where such relative position is susceptible to variation due to temperature change from any cause and resultant contraction or expansion of the parts or fixtures.

From the above description it will be apparent that there is thus provided a device of the character described possessing the particular features of advantage before enumerated as desirable, but which obviously is susceptible of modification in its form, proportions, detail construction and arrangements of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a machine of the character described wherein heat is developed incident to machine operation, a heating means for minimizing temperature produced fluctuations in expansion and contraction of a machine part and resulting deviation of operating and work members by subjecting the machine part to heat produced independently of that developed by machine operation, and a regulator for controlling the independently produced heat so as to subject the machine part to a degree of heat inversely proportionate to that produced by machine operation and thereby maintain a substantially uniform temperature of the machine part at a degree at least equal to the highest degree produced by machine operation.

2. In a machine of the character described wherein heat is developed incident to machine operation, and the temperature of the machine parts fluctuates in accordance with the degree of machine operation and atmospheric influences and conditions, a thermo-syphonic operating heating means effective to absorb the temperature fluctuations and maintain the temperature of the machine uniform to minimize temperature produced expansion and contraction of the machine parts and resulting deviation of operating and work members, a regulator for controlling operation of the thermo-syphonic operating heating means, and means associated with the thermo-syphonic operating heating means effective to deter rapid or violent fluctuations therein.

3. The method of minimizing constructional and expansional change and part displacement in a machine wherein fluctuating degrees of heat are developed incident to machine operation with coincident contractional and expansional change in the relative positions and dimensions of the machine parts, which includes supplying heat to the machine parts other than that developed by machine operation and in degrees converse to the degrees of heat developed by machine operation whereby to maintain a uniform temperature of the machine parts.

4. In the art of manufacture and part assembly of a machine wherein temperature fluctuations are produced by machine operation, the method which consists in heating the parts to a temperature at least equal to the highest temperature produced by machine operation, and finishing and assembling the parts while at that temperature.

5. In a machine including a rotatable member and bearings therefor, and wherein rotation of the member relative to the bearings produces a rise in the temperature of the member and bearings, a fluid thermo-syphonic operating supplemental heating means for minimizing temperature produced expansion and contraction of the member and bearings and resulting deviation of the member and bearings by maintaining the temperature of the member and bearings substantially equal to the highest temperature produced by rotation of the member relative to the bearings, a regulator for the supplemental heating means and means for maintaining the supply of heating fluid constant.

6. In a machine assembly of the character described, a frame, spaced bearings therein, a rotatable hollow spindle supported in the bearings, a work supporting and locating member within the spindle, a lateral opening in the spindle through which access may be had to the work supporting and locating means, and means for minimizing expansion and contraction of the member and bearings and resulting deviation of the bearings and member including means for supplying heat to the assembly supplemental to heat generated by and during operation of the machine or any parts to compensate for fluctuations in such generated heat and maintain the machine and its operating parts at a uniform temperature.

7. In a machine assembly of the character described, a frame, spaced bearings therein, a rotatable hollow spindle supported in the bearings, a work supporting and locating means within the spindle, a lateral openings in the spindle through which access may be had to the work supporting and locating means, a cover for the opening, and means for minimizing expansion and contraction thereof and resulting deviation of operating and work members including means for supplying heat to the assembly supplemental to heat generated by and during operation of the machine or any parts and inversely proportionate thereto to compensate for fluctuations in such generated heat and maintain the machine and its operating parts at a uniform temperature.

8. In a machine assembly of the character described, a frame, spaced bearings therein, a rotatable hollow spindle supported in the bearings, a work supporting and locating means within the spindle, a lateral opening in the spindle through which access may be had to the work supporting and locating means, means for minimizing expansion and contraction thereof and resulting deviation of operating and work members including a fluid thermo-syphonic operating means for minimizing expansion and contraction thereof and resulting deviation of operating and work members, including means for supplying heat to the assembly supplemental to heat generated by and during operation of the machine and inversely proportionate thereto to compensate for fluctuations in such generated heat and maintain the machine and its operating parts at a uniform temperature, and means for controlling the amount and degree of heat supplied.

9. In a machine wherein heat is developed incident to machine operation, supplemental heating means for minimizing expansion and contraction of the machine parts and resulting deviation of the operating and work members by controlling temperature fluctuations and resultant contractional and expansional displacement of machine parts, and means associated with the supplemental heating means effective to deter rapid or violent fluctuations in temperature thereof.

10. The herein described method of minimizing deviation of operating and work members incident to expansion and contraction of the parts of a machine tool, including the step of subjecting the machine to supplemental heat supply inversely proportionate to the temperature fluctuations of the machine produced incident to its operation and influence of atmospheric conditions, the procedure being such that the temperature of the machine is maintained substantially constant at a degree at least equal to the highest temperature induced under ordinary working conditions.

11. The method of producing a machine tool having parts moving relatively to each other during machine operation and thereby generating heat and producing an increase in machine temperature, which includes assembling the parts into operative relation while at a temperature substantially coincident with the temperature produced in the parts by machine operation, and thereafter supplying supplemental heat to the tool to compensate for fluctuations in such generated heat and maintain the machine and its operating parts at a constant temperature at least equal to the temperature of the machine parts at assembly.

12. The method of operating a machine wherein relatively movable parts are so arranged with respect to each other as to produce friction and generate heat by their relative movement, which includes subjecting the parts to heat from a fluid medium and independently of the heat generated by friction between the relatively movable parts, and of a higher degree than that generated by friction between the relatively movable parts, to maintain the parts at a temperature higher than that induced by such friction.

13. The method of minimizing contractional and expansional part displacement and change of dimension in a machine wherein fluctuating degrees of heat are developed incident to machine operation with coincident contractional and expansional change in the relative positions and dimensions of the machine parts, which includes constantly circulating a fluid heating medium in effective relation with the machine parts and regulating the temperature of the circulated fluid heating medium so as to supply a degree of heat which, either supplemented by or independently of the heat developed by machine operation, maintains the machine parts at a preselected temperature.

14. The method of minimizing contractional and expansional part displacement and change of dimension in a machine wherein fluctuating degrees of heat are developed incident to machine operation with coincident contractional and expansional change in the relative positions and dimensions of the machine parts, which includes supplying supplemental heat to the machine parts, and regulating the supplied supplemental heat with respect to the degree of heat developed by machine operation in such manner as to maintain the machine parts at a preselected temperature at least equal to the maximum temperature developed by machine operation.

15. In a machine assembly wherein tool and work members are moved relatively to each other for prescribed operation on the work member by the tool, a frame, bearings in the frame, a rotatable spindle supported in the bearings, a work supporting and locating means associated with the spindle, and means for minimizing temperature produced contraction and expansion of the assembly parts and resulting deviation of tool and work members from prescribed position, including means for supplying heat to the assembly supplemental to heat generated by and during machine operation and inversely proportionate thereto to compensate for fluctuations in such generated heat and maintain the machine assembly at a uniform temperature, and a regulator for controlling the amount and degree of supplemental heat supplied.

16. In a machine assembly wherein tool and work members are moved relatively to each other for prescribed operation on the work member by the tool, a frame, bearings in the frame, a rotatable spindle supported in the bearings, a work supporting and locating means associated with the spindle, and means for minimizing temperature produced contraction and expansion of the assembly parts and resulting deviation of tool and work members from prescribed position, including a fluid thermo-syphonic operating means for supplying heat to the assembly supplemental to heat generated by and during machine operation and inversely proportionate thereto to compensate for fluctuations in such generated heat and maintain the machine assembly at a uniform temperature, and a regulator for controlling the amount and degree of supplemental heat supplied.

RALPH P. GARRISON.
JOHN R. GARRISON.